United States Patent
Ma et al.

(10) Patent No.: US 11,319,430 B2
(45) Date of Patent: May 3, 2022

(54) NITRILE RUBBER COMPOSITE, PREPARATION METHOD THEREOF, AND SEALING RING USING THE SAME

(71) Applicants: UNISOL MEMBRANE TECHNOLOGY (XIAMEN) CO., LTD., Xiamen (CN); Xiamen Jiarong Technology Corp., Ltd, Xiamen (CN); Xiamen University of Technology, Xiamen (CN)

(72) Inventors: Zhipeng Ma, Xiamen (CN); Bin Yan, Xiamen (CN); Jing Zhou, Xiamen (CN); Tingliang Zhong, Xiamen (CN)

(73) Assignees: UNISOL MEMBRANE TECHNOLOGY (XIAMEN) CO., LTD, Xiamen (CN); XIAMEN JIARONG TECHNOLOGY CORP., LTD., Xiamen (CN); XIAMEN UNIVERSITY OF TECHNOLOGY, Xiamen (CN)

( * ) Notice: Subject to any disclaimer, the term of this patent is extended or adjusted under 35 U.S.C. 154(b) by 150 days.

(21) Appl. No.: 16/744,796

(22) Filed: Jan. 16, 2020

(65) Prior Publication Data
US 2021/0095103 A1    Apr. 1, 2021

(30) Foreign Application Priority Data
Sep. 26, 2019 (CN) .......................... 201910915524.6

(51) Int. Cl.
| | |
|---|---|
| *C08L 9/02* | (2006.01) |
| *C08K 3/04* | (2006.01) |
| *C08K 5/13* | (2006.01) |
| *C08K 5/14* | (2006.01) |
| *C08K 5/3415* | (2006.01) |
| *C08K 5/3492* | (2006.01) |
| *C08K 9/06* | (2006.01) |
| *C08K 9/08* | (2006.01) |

(52) U.S. Cl.
CPC ............... *C08L 9/02* (2013.01); *C08K 3/042* (2017.05); *C08K 5/13* (2013.01); *C08K 5/14* (2013.01); *C08K 5/3415* (2013.01); *C08K 5/34924* (2013.01); *C08K 9/06* (2013.01); *C08K 9/08* (2013.01); *C08K 2201/014* (2013.01)

(58) Field of Classification Search
CPC combination set(s) only.
See application file for complete search history.

(56) References Cited

U.S. PATENT DOCUMENTS

2015/0344666 A1    12/2015  Macosko et al.

FOREIGN PATENT DOCUMENTS

| CN | 106633243 | | 5/2017 |
|---|---|---|---|
| CN | 107082914 | | 8/2017 |
| CN | 108084803 | | 5/2018 |
| CN | 108102169 | | 6/2018 |
| CN | 108485008 | | 9/2018 |
| CN | 109503902 | A * | 3/2019 |
| CN | 109867830 | A * | 6/2019 |

OTHER PUBLICATIONS

Machine translation of CN-109867830-A (Year: 2019).*
Machine translation of CN 106633243 A (Year: 2017).*

* cited by examiner

*Primary Examiner* — Wenwen Cai
(74) *Attorney, Agent, or Firm* — Onello & Mello, LLP

(57) ABSTRACT

A present invention provides a nitrite rubber composite, a preparation method thereof and a sealing ring using the composite are provided. The nitrile rubber composite provided by the present invention contains the following preparation raw materials in parts by mass: 100 parts of raw nitrile rubber, 0.1-5 parts of liquid nitrite rubber modified graphene oxide, 60-90 parts of liquid nitrite rubber modified carbon black, 1-3 parts of anti-aging agent, 2-6 parts of compound vulcanizing agent, and 1-3 parts of accelerant.

18 Claims, No Drawings

NITRILE RUBBER COMPOSITE, PREPARATION METHOD THEREOF, AND SEALING RING USING THE SAME

CROSS REFERENCE TO RELATED APPLICATIONS

The present application claims the benefit of priority under 35 USC 119 to Chinese patent application 201910915524.6, filed Sep. 26, 2019, the contents of which are incorporated herein by reference.

TECHNICAL FIELD

The present invention relates to the technical field of composite materials, and specifically relates to a nitrile rubber composite, a preparation method thereof, and a sealing ring using the same.

BACKGROUND

Reverse osmosis is also called antiosmosis, which is a membrane separation technology for separating out solvent from solution by using pressure difference as driving force. Reverse osmosis realizes the purposes of separating, extracting, purifying and concentrating by virtue of reverse osmosis membranes (RO membranes). In high-concentration water treatment processes, for example, seawater purification, landfill leachate treatment, desulfurization waste water treatment and the like, RO membranes usually need to be mounted on polymer support plates. A disc tube reverse osmosis module is generally formed by packaging multiple layers of RO membranes with multiple layers of associated support plates, sealing elements and metal structural elements; and, a sealing ring needs to be mounted between two support plates to prevent seawater, sewage and the like from flowing to a middle water outlet pipe and needing to be filtered. In order to increase water penetration speed, pressure applied to RO membranes may become higher and higher, for example increasing from 9.0 MPa to 16.0 MPa, and there may be an attempt to further increase applied pressure up to 25.0 MPa in order to further increase the water penetration speed. As a result, higher structural requirements have been proposed for the tensile strength, hardness and permanent compression of a sealing ring used in RO equipment.

Currently, nitrile rubber (NBR) is generally adopted as the material for fabricating sealing rings for RO applications. Chinese patent application publication number CN107082914A discloses a nitrile rubber composite containing nitrile rubber 100 parts, carbon black 80 parts, dioctyl sebacate 40 parts, modified talcum powder 60 parts, zinc oxide 8 parts, stearic acid 3 parts, coumarone 8 parts, an anti-aging agent RD 3 parts, an anti-aging agent 4010NA 4 parts, a dispersing agent 4 parts, a moisture absorbent 20 parts, sulphur S 5 parts, an accelerant D 2 parts, another accelerant 4 parts, and an accelerant DPTT 4 parts. This product undergoes microwave treatment in a first processing section and hot air vulcanization forming in a second processing section after being extruded. The nitrile rubber product obtained using this method has hardness reaching 72 degrees (Shore A), tensile strength reaching 15.6 MPa, and permanent compression of 28%. However, the tensile strength of the nitrile rubber product prepared according to the foregoing method needs to be improved, and the permanent compression is relatively high. Chinese patent application publication numbers CN106633243A, CN108102169A and CN108485008A respectively disclose different preparation methods resulting in nitrile rubber composites with high tensile strength, high hardness and low permanent compression. However, because of the addition of plasticizer or softener to these formulations, the loss of plasticizer or softener will cause deterioration of the performance of these nitrile rubber composites after being used for a period of time, which is not acceptable for meeting the performance requirements for high performance RO applications.

SUMMARY

The objective of the present invention is to provide a nitrile rubber composite, a preparation method thereof, and a sealing ring using the composite and having excellent performance characteristics for RO applications. The sealing ring is prepared using the nitrile rubber composite provided by the present invention, which is high in hardness and tensile strength, low in permanent compression, and long in service life.

In order to achieve the foregoing purposes, the present invention provides the following technical scheme:

The present invention provides a nitrile rubber composite containing the following preparation raw materials in parts by mass:
  100 parts of crude nitrile rubber,
  0.1-5 parts of liquid nitrile rubber modified graphene oxide;
  60-90 parts of liquid nitrile rubber modified carbon black;
  1-3 parts of anti-aging agent;
  2-6 parts of compound vulcanizing agent; and
  1-3 parts of accelerant.

Preferably, the Mooney viscosity of the crude nitrile rubber used herein is 40-65; and the mass fraction of acrylonitrile in the crude nitrile rubber is 20-30%.

Preferably, the liquid nitrile rubber modified graphene oxide used herein is obtained from reaction of amino-terminated liquid nitrile rubber with graphene oxide.

Preferably, the liquid nitrile rubber modified carbon black used herein is obtained from reaction of amino-terminated liquid nitrile rubber with carbon black treated with an epoxy silane coupling agent.

Preferably, the relative molecular mass of the amino-terminated liquid nitrile rubber used in preparing the carbon black is 2000-4000; and the mass fraction of amino in the amino-terminated liquid nitrile rubber is ≥15%.

Preferably, the epoxy silane coupling agent used in preparing the carbon black includes one or several of the following: 3-(glycidoxypropyl)triethoxysilane, 3-(glycidoxypropyl)trimethoxysilane, (3-glycidoxypropyl)methyldiethoxysilane, (3-glycidoxypropyl)methyldimethoxysilane, 2-(3,4-epoxycyclohexyl)ethyltriethoxysilane and 2-(3,4-epoxycyclohexyl)ethyltrimethoxysilane Preferably, the carbon black includes semi-reinforcing carbon black and fine-particle thermal-cracking carbon black.

Preferably, the anti-aging agent includes one or several of the following: anti-aging agent 2246, anti-aging agent RD and anti-aging agent 4020;

Preferably, the compound vulcanizing agent includes sulphur and a peroxide vulcanizing agent; and Preferably, the accelerant includes one or several of the following: triallyl cyanurate, triallyl isocyanurate and m-phenylene bismaleimide.

The present invention provides a preparation method of the nitrile rubber composite according to the foregoing technical scheme, including the following step: mixing crude nitrile rubber, liquid nitrile rubber modified graphene oxide, liquid nitrile rubber modified carbon black, an anti-aging agent, a compound vulcanizing agent and an accelerant in the proportions described above to obtain the nitrile rubber composite of this invention.

The present invention also provides a sealing ring prepared using the nitrile rubber composite of the foregoing technical scheme according to the described preparation method.

In the nitrile rubber composite provided by the present invention, liquid nitrile rubber and crude nitrile rubber have a similar structure. As a result, liquid nitrile rubber modified graphene oxide and carbon black are adopted; and, after treatment, the obtained liquid nitrile rubber modified graphene oxide, the liquid nitrile rubber modified carbon black and the crude nitrile rubber have good compatibility. Moreover, because liquid nitrile rubber and crude nitrile rubber have a similar chemical structure, when nitrile rubber undergoes vulcanization crosslinking, liquid nitrile rubber may be also vulcanized, so that the compatibility of the carbon black and nitrile rubber components is improved. Meanwhile, the carbon black and nitrile rubber become at least partly chemically bonded and stabilized. Therefore, the nitrile rubber composite provided by the present invention has relatively good mechanical properties, and it can relatively easily be processed into a sealing ring for RO applications.

In addition, the nitrile rubber composite provided by the present invention does not contain substances such as a plasticizer or a softener, and has good structural stability. A sealing ring prepared using the nitrile rubber composite of this invention has high tensile strength and hardness, low permanent compression and long service life when a high external pressure is applied. Thus, such a sealing ring may be utilized in reverse osmosis devices in the field of water treatment. Results of the invention embodiments show that the hardness of the sealing ring provided by the present invention may reach more than 63 degrees (Shore A), tensile strength may reach more than 19 MPa, and permanent compression may be as low as 17.1%. Reverse osmosis devices using such a sealing ring still have good tightness after steadily running for 6 months when the applied pressure of reverse osmosis reaches as high as 25 MPa and without leakage during application.

DESCRIPTION OF THE EMBODIMENTS

The present invention provides a nitrile rubber composite containing the following preparation raw materials in parts by mass:
  100 parts of crude nitrile rubber,
  0.1-5 parts of liquid nitrile rubber modified graphene oxide;
  60-90 parts of liquid nitrile rubber modified carbon black;
  1-3 parts of anti-aging agent;
  2-6 parts of compound vulcanizing agent; and
  1-3 parts of accelerant.

According to an embodiment of the present invention, the Mooney viscosity (ML1+4, 100° C.) of the crude nitrile rubber used herein is preferably 40-65; and the mass fraction of acrylonitrile in the crude nitrile rubber is preferably 20-30%. According to an embodiment of the present invention, there is no special limitation to the viscosity of the crude nitrile rubber, and it is preferred to adopt crude nitrile rubber (with model number of N240S and/or N241) of JSR Corporation of Japan. When adopting a mixture of crude nitrile rubber of the two foregoing model numbers, there is no special limitation to the ratio of crude nitrile rubber of the two model numbers, and any ratio may be adopted.

Based on mass fraction of the crude nitrile rubber, another raw material component of the nitrile rubber composite provided by the present invention is about 0.1-5 parts of liquid nitrile rubber modified graphene oxide, preferably, about 0.15-4.8 parts, more preferably, about 0.5-3.5 parts, further preferably, about 0.8-2.7 parts. According to an embodiment of the present invention, a relatively small amount of liquid nitrile rubber modified graphene oxide is added so as to improve the strength of a sealing ring prepared from the nitrile rubber composite and also to reduce the permanent compression, which results in prolonging the service life of a sealing ring being used in a relatively high performance environment.

According to an embodiment of the present invention, the liquid nitrile rubber modified graphene oxide is prepared from a reaction of amino-terminated liquid nitrile rubber with graphene oxide. The relative molecular mass of the amino-terminated liquid nitrile rubber is preferably about 2000-4000 in the present invention; and the mass fraction of amino in the amino-terminated liquid nitrile rubber is preferably ≥15%. In an embodiment of the present invention, amino-terminated liquid nitrile rubber (with model number of 1300X16) produced by Lubrizol Company is adopted. There is no special limitation to a specific preparation method of the liquid nitrile rubber modified graphene oxide, which may be prepared by adopting a method well-known by skilled personnel in this field. In an embodiment of the present invention, liquid nitrile rubber modified graphene oxide is prepared with reference to a method as described in U.S. patent publication no. US20150344666A1.

Based on mass fraction of the crude nitrile rubber, another raw material component of the nitrile rubber composite provided by the present invention is about 60-90 parts of liquid nitrile rubber modified carbon black, preferably, about 65-85 parts, more preferably, about 70-80 parts. According to an embodiment of the present invention, carbon black is capable of increasing the hardness of the resulting composite and improving the tensile strength of the nitrile rubber composite. However, along with an increase in the amount of carbon black, the viscosity of the rubber material becomes higher and higher, especially, when high-hardness (with hardness reaching more than Shore A 80 degrees) nitrile rubber is prepared. When the amount of carbon black is relatively large, the viscosity of the rubber material in the later stages of processing becomes relatively high, resulting in difficulty in processing. At the same time, heat generation also increases, which may affect the performance of the rubber material after vulcanization. According to an embodiment of the present invention, liquid nitrile rubber modified carbon black is adopted as a raw material to prepare the nitrile rubber composite so as to improve the compatibility of carbon black and crude nitrile rubber. By increasing the amount of carbon black in a certain processing condition, the hardness and strength of a sealing ring prepared from the resulting nitrile rubber composite can be improved.

According to an embodiment of the present invention, the liquid nitrile rubber modified carbon black is preferably obtained from reaction of amino-terminated liquid nitrile rubber with carbon black treated with an epoxy silane coupling agent specifically, including the following steps:
  performing modification treatment on carbon black by adopting an epoxy silane coupling agent, to obtain epoxy silane coupling agent modified carbon black; and reacting amino-terminated liquid nitrile rubber with the epoxy silane coupling agent modified carbon black to obtain liquid nitrile rubber modified carbon black.

According to an embodiment of the present invention, an epoxy silane coupling agent is preferably adopted to perform modification treatment on carbon black to obtain the epoxy silane coupling agent modified carbon black. According to an embodiment of the present invention, the epoxy silane coupling agent preferably includes one or several of the following: 3-(glycidoxypropyl)triethoxy silane, γ-(2,3-epoxypropoxy)propytrimethoxy silane, (3-Glycidoxypropyl) methyldiethoxysilane, 3-glycidoxypropyl methyldimethoxysilane, 2-(3,4-cyclohexyl epoxide)ethyltriethoxysilane and 2-(3,4-cyclohexyl epoxide)ethyltrimethoxysilane. According to an embodiment of the present invention, the carbon black preferably includes semi-reinforcing carbon black and fine-particle thermal-cracking carbon black, a mass ratio between the semi-reinforcing carbon black and the fine-particle thermal-cracking carbon black being preferably in the range of about (1-8):(2-9), more preferably, about (2-4):(6-8). According to an embodiment of the present invention, the semi-reinforcing carbon black preferably includes gas-furnace-process semi-reinforcing carbon black N770 or gas-furnace-process semi-reinforcing carbon black N774, and the fine-particle thermal-cracking carbon black preferably includes fine-particle thermal-cracking carbon black N880. According to an embodiment of the present invention, there is no special limitation to specific operation steps of the modification treatment, and a mode well-known by skilled personnel in this field may be adopted. In an embodiment of the present invention, the modification treatment performed on carbon black by adopting an epoxy silane coupling agent is according to a method as described in Chinese patent publication no. CN108084803A.

According to an embodiment of the present invention, amino-terminated liquid nitrile rubber is reacted with the obtained epoxy silane coupling agent modified carbon black to obtain liquid nitrile rubber modified carbon black. According to an embodiment of the present invention, the relative molecular mass of the amino-terminated liquid nitrile rubber is preferably about 2000-4000; and the mass fraction of amino in the amino-terminated liquid nitrile rubber is preferably ≥15%. In an embodiment of the present invention, amino-terminated liquid nitrile rubber (with model number of 1300X16) produced by Lubrizol Company is adopted. According to an embodiment of the present invention, a mass ratio between the amino-terminated liquid nitrile rubber and the epoxy silane coupling agent modified carbon black is preferably in the range of about 5:(0.8-1.2), more preferably, about 5:1. According to an embodiment of the present invention, the reaction is preferably performed in organic solvent, the organic solvent preferably includes ethyl acetate; and the mass of the ethyl acetate is preferably about 6-7 times of the mass of amino-terminated liquid nitrile rubber.

According to an embodiment of the present invention, the above-described reaction preferably includes two stages which are executed in sequence, wherein a reaction temperature of a first stage is preferably about 15-35° C., more preferably, about 20-25° C. In an embodiment, the first stage may be performed at room temperature. The reaction time of the first stage is preferably about 50-70 min., more preferably, about 60 min. The reaction temperature of the second stage is preferably about 40-45° C., and the reaction time is preferably about 50-70 min, more preferably, about 60 min. According to an embodiment of the present invention, the reaction is preferably performed in the foregoing conditions so as to realize sufficient reaction of amino-terminated liquid nitrile rubber with epoxy silane coupling agent modified carbon black, and to control the reaction rate for improved reaction safety.

After completion of the reaction, according to an embodiment of the present invention, the product is preferably filtered, solids are filtered out, washed with ethyl acetate for about 3-5 times, and then liquid nitrile rubber modified carbon black is recovered after drying. According to an embodiment of the present invention, there is no special limitation to the filtering, washing and drying steps, and methods well-known by skilled personnel in this field may be adopted.

Based on mass fraction of the crude nitrile rubber, another raw material component of the nitrile rubber composite provided by the present invention is about 1-3 parts of anti-aging agent, preferably, about 1.2-2.5 parts, more preferably, about 1.5-2.0 parts. According to an embodiment of the present invention, the anti-aging agent preferably includes one or several of the following: anti-aging agent 2246, anti-aging agent RD and anti-aging agent 4020, more preferably, anti-aging agent 2246.

Based on mass fraction of the crude nitrile rubber, another raw material component of the nitrile rubber composite provided by the present invention is about 2-6 parts of compound vulcanizing agent, preferably, about 3-5 parts. According to an embodiment of the present invention, the compound vulcanizing agent preferably includes sulphur and peroxide vulcanizing agent, the peroxide vulcanizing agent preferably includes dicumyl peroxide; and a mass ratio between sulphur and dicumyl peroxide is preferably in a range of about (1-3):(7-9).

Based on mass fraction of the crude nitrile rubber, another raw material component of the nitrile rubber composite provided by the present invention is about 1-3 parts of accelerant, preferably, about 1.5-2.5 parts. According to an embodiment of the present invention, the accelerant preferably includes one or several of the following: triallyl cyanurate, triallyl isocyanurate and m-phenylene bismaleimide, more preferably, it includes triallyl cyanurate or triallyl isocyanurate.

The present invention also provides a preparation method for the nitrile rubber composite as described in the foregoing technical scheme, including the following step: mixing crude nitrile rubber, liquid nitrile rubber modified graphene oxide, liquid nitrile rubber modified carbon black, an anti-aging agent, a compound vulcanizing agent and an accelerant to obtain the nitrile rubber composite of this invention.

According to an embodiment of the present invention, a preparation method of the nitrile rubber composite preferably includes the following steps:

performing a first mill run press fit on crude nitrile rubber to obtain a first mill run press fit material;

mixing the first mill run press fit material with an anti-aging agent and then performing a second mill run press fit, to obtain a second mill run press fit material;

mixing the second mill run press fit material with liquid nitrile rubber modified graphene oxide and liquid nitrile rubber modified carbon black and then performing a third mill run press fit to obtain a third mill run press fit material;

mixing the third mill run press fit material with a compound vulcanizing agent and an accelerant and then performing a fourth mill run press fit to obtain a fourth press fit material; and performing a fifth mill run press fit on the fourth mill run press fit material to obtain the desired nitrile rubber composite.

According to an embodiment of the present invention, the complete process of preparing the nitrile rubber composite is preferably performed on a three-roller machine.

According to an embodiment of the invention, the first mill run press fit is preferably performed on crude nitrile rubber to obtain a first mill run press fit material. According to an embodiment of the invention, in a first mill run press fit process, the roller space of a three-roller machine is preferably about 1-2 mm; and the first mill run press fit time is preferably about 5-10 min.

After a first mill run press fit material is obtained, according to an embodiment of the present invention, preferably, a second mill run press fit is performed after the first mill run press fit material is mixed with an anti-aging agent to obtain a second mill run press fit material. According to an embodiment of the present invention, in a second mill run press fit process, the roller space of a three-roller machine is preferably about 2-3 mm; and the second mill run press fit time is preferably about 2-3 min.

After a second mill run press fit material is obtained, according to an embodiment of the present invention, preferably, a third mill run press fit is performed after the second mill run press fit material is mixed with liquid nitrile rubber modified graphene oxide and liquid nitrile rubber modified carbon black to obtain a third mill run press fit material. According to an embodiment of the present invention, preferably, a mixture of liquid nitrile rubber modified graphene oxide and liquid nitrile rubber modified carbon black is added in about 3-5 batches. In the third mill run press fit process, the roller space of the three-roller machine is preferably about 4-6 mm, and after each time that a mixture of liquid nitrile rubber modified graphene oxide and liquid nitrile rubber modified carbon black is added, the mill run press fit time is preferably about 10-15 min. According to an embodiment of the present invention, by adding a mixture of liquid nitrile rubber modified graphene oxide and liquid nitrile rubber modified carbon black in batches, the dispersibility of liquid nitrile rubber modified graphene oxide and liquid nitrile rubber modified carbon black in crude nitrile rubber can be improved, and thereby make full use of the liquid nitrile rubber modified graphene oxide and the liquid nitrile rubber modified carbon black, and resulting in a nitrile rubber composite with excellent mechanical properties.

After a third mill run press fit material is obtained, according to an embodiment of the present invention, preferably, a fourth mill run press fit is performed after the third mill run press fit material is mixed with a compound vulcanizing agent and an accelerant to obtain a fourth mill run press fit material. According to an embodiment of the present invention, in a fourth mill run press fit process, the roller space of a three-roller machine is preferably about 4-6 mm; and the fourth mill run press fit time is preferably about 2-3 min.

After a fourth mill run press fit material is obtained, according to an embodiment of the present invention, preferably, a fifth mill run press fit is performed on the fourth mill run press fit material to obtain the nitrile rubber composite. According to an embodiment of the present invention, in a fifth mill run press fit process, the roller space of a three-roller machine is preferably about 1-2 mm; and the fifth mill run press fit time is preferably about 3-5 min.

After the fifth mill run press fit is completed, according to an embodiment of the present invention, preferably, the product is cooled to room temperature. The foregoing process from first mill run press fit to fifth mill run press fit is preferably executed at room temperature; however, the mill run press fit will generate frictional heat resulting in an increase of material temperature. As a result, subsequent treatment is preferably performed after the product has been cooled to room temperature. The subsequent treatment includes continuing to perform mill run press fit for about 2 times, and releasing a sheet to obtain the nitrile rubber composite. According to an embodiment of the present invention, in the last two times of mill run press fit processes, the roller space of a three-roller machine is preferably about 2-3 mm; and each mill run press fit time is preferably about 2-3 min.

In an embodiment, the present invention also provides a sealing ring prepared using the nitrile rubber composite of the foregoing technical scheme and preparation methods. According to an embodiment of the present invention, the nitrile rubber composite is preferably used as the preparation material, and a sealing ring is prepared by a process of injection molding compression molding, transmitting compression molding or slab compression molding. According to an embodiment of the present invention, there is no special limitation to a mode of the injection molding compression molding, transmitting compression molding or slab compression molding, and a method well-known by skilled personnel in this field may be adopted. In an embodiment of the present invention, a sealing ring is prepared by adopting a slab compression molding method, wherein slab compression molding is preferably performed in conditions of about 1.5-2.5 MPa, at a temperature of about 175-185° C.

The following describes the technical solutions in embodiments of the present invention and with reference to embodiments as described above. It should be understood, however, that the described embodiments are only some of the embodiments of the present invention rather than all of the embodiments. All other embodiments obtained by general technical personnel in the field based on the embodiments of the present invention without creative efforts should be considered to be within the protection and scope of the present disclosure.

Embodiments 1-8

Preparation of liquid nitrile rubber-modified graphene oxide (abbreviated as LNBR-GO):

Liquid nitrile rubber-modified graphene oxide was prepared by using a method according to U.S. patent publication no. US20150344666A1, where an amino-terminated liquid nitrile rubber (abbreviated as ATBN) was purchased from Lubrizol Corporation, and was specifically a 1300X16 type amino-terminated nitrile rubber liquid.

Preparation of liquid nitrile rubber-modified carbon black (abbreviated as LNBR-C): carbon black was modified by using an epoxy silane coupling agent (specifically, a silane coupling agent KH-560) according to the method of the Chinese invention patent NO. CN108084803A to obtain epoxy silane coupling agent-modified carbon black; 1 part by mass of epoxy silane coupling agent-modified carbon black was dispersed in 30 parts by mass of ethyl acetate, and 5 parts by mass of amino-terminated liquid nitrile rubber (abbreviated as ATBN, purchased from Lubrizol Corporation, specifically being a 1300X16 type) was added; the reaction was performed with stirring at room temperature (25° C.) for 1 hour, and stirring continued for another 1 hour when the temperature was raised to 40° C.; after the reaction was completed, filtering out the obtained solid and washing it with ethyl acetate three times, and then the liquid nitrile rubber-modified carbon black was obtained after drying.

The preparation raw materials in Embodiments 1-8 were selected as follows, and the specific types and amounts are listed in Table 1 below:

A raw nitrile rubber was N240S and/or N241 type raw nitrile rubber of Japan JSR Co., Ltd.;

LNBR-GO was prepared according to the foregoing method;

LNBR-C was prepared according to the foregoing method, where carbon black used was semi-reinforcing carbon black (gas furnace process semi-reinforcing carbon black N770 or gas furnace process semi-reinforcing carbon black N774) and fine particle pyrolysis carbon black (fine particle pyrolysis carbon black N880);

an anti-aging agent was an anti-aging agent 2246;

a compound vulcanizing agent was sulfur and dicumyl peroxide; and an accelerator was triallyl cyanurate or triallyl isocyanurate.

The preparation of the nitrile rubber composite using the foregoing preparation raw materials included the following steps:

performing mill run press fit on the raw nitrile rubber for 8 min. on a three-roller machine under the conditions of a roller spacing of 2 mm;

adding the anti-aging agent, performing mill run press fit for 3 min. under the conditions of a roller spacing of 2 mm; adding the LNBR-GO and the LNBR-C in 4 batches, performing mill run press fit under the conditions of a roller spacing of 5 mm, and fit for 10 min. after each feeding;

adding the compound vulcanizing agent and the accelerator, and performing mill run press fit for 3 min under the conditions of a roller spacing of 5 mm;

adjusting the roller spacing to 1 mm, performing mill run press fit for 3 min. and then cooling to room temperature, continuing to perform mill run press fit twice (the roller spacing is 2 mm and the time for mill run press fit performed every time was 2 min.), and recovering the batch-out to obtain a nitrile rubber composite.

The preparation of a seal ring using the nitrile rubber composite included the following steps: performing flat plate compression molding on the nitrile rubber composite under the conditions of 2 MPa and 180° C. to obtain a seal ring.

Comparative Example 1

100 parts by weight of raw nitrile rubber (composed of 60 parts of N240S and 40 parts of JSR® N241), 1.1 parts by weight of LNBR-GO, 85 parts by weight of carbon black (composed of 20 parts of N770 and 60 parts of N880), 10 parts by weight of dioctyl phthalate (softener, abbreviated as DOP), 2.5 parts by weight of anti-aging agent 2246, 5 parts by weight of compound vulcanizing agent (composed of 1 part of sulfur and 4 parts of dicumyl peroxide) and 2 parts by weight of triallyl cyanurate were processed according to the described method in the foregoing embodiment to obtain nitrile rubber composite, and a seal ring was then prepared using the comparative example 1 composite.

Comparative Example 2

100 parts by weight of raw nitrile rubber (composed of 60 parts of N240S and 40 parts of JSR® N241), 85 parts by weight of carbon black (composed of 20 parts of N770 and 60 parts of N880), 10 parts by weight of softener DOP, 2.5 parts by weight of anti-aging agent 2246, 5 parts by weight of compound vulcanizing agent (composed of 1 part of sulfur and 4 parts of dicumyl peroxide) and 2 parts by weight of triallyl cyanurate were processed according to the described method in the foregoing embodiment to obtain nitrile rubber composite, and a seal ring was then prepared using the comparative example 2 composite.

Performance Test

The properties of the nitrile rubber composites and seal rings obtained in Embodiments 1-8 and Comparative Examples 1 and 2 were tested, as follows: Minimum torque $M_L$: The minimum torque $M_L$ of the nitrile rubber composite was tested using a vulcameter according to a method in ASTM D-2084; the lower the ML value, the greater the viscosity of the rubber and the more difficult the processing.

Tensile strength: 25° C., the seal ring was tested according to GB/T528-2009 requirements.

Shore A hardness: 25° C., the seal ring was tested according to GB/T531-2009 requirements.

Permanent compression: The seal ring was tested according to the requirements of GB/T1683-2018. The test temperature was 100° C., the test time was 22 hours and 30 hours respectively, the compression ratio of samples was 30%, and a limiter with a height of 8 mm was selected; a

TABLE 1

Types and amounts of preparation raw materials in Embodiments 1-8

| Types of prepared raw materials in Embodiments 1-8 | | Amounts (mass parts) of preparation raw materials in Embodiments 1-8 | | | | | | | |
|---|---|---|---|---|---|---|---|---|---|
| | | 1 | 2 | 3 | 4 | 5 | 6 | 7 | 8 |
| Raw nitrile rubber | N240S | 100 | 15 | 35 | 45 | 60 | 75 | 90 | 0 |
| | N241 | 0 | 85 | 65 | 55 | 40 | 25 | 10 | 100 |
| LNBR-GO | | 0.15 | 0.5 | 0.8 | 1.1 | 1.9 | 2.7 | 3.5 | 4.8 |
| LNBR-C | N770 | 6 | 12 | 10 | 25 | 27 | 10 | 0 | 0 |
| | N774 | 0 | 0 | 12 | 0 | 0 | 16 | 24 | 42 |
| | N880 | 54 | 52 | 50 | 60 | 63 | 64 | 56 | 43 |
| Anti-aging agent 2246 | | 1.2 | 1.5 | 2.0 | 3.0 | 2.5 | 2.0 | 2.0 | 1.8 |
| Compound vulcanizing agent | Sulfur | 0.4 | 1.2 | 1 | 1 | 1 | 1 | 1 | 1 |
| | Dicumyl peroxide | 3.6 | 3 | 4 | 4 | 4 | 4 | 4 | 4 |
| Accelerator | Triallyl cyanurate | 1.5 | 2 | 2.5 | 3 | 0 | 0 | 0 | 0 |
| | Triallyl isocyanurate | 0 | 0 | 0 | 0 | 2.5 | 3 | 2.5 | 3 | permanent compression obtained when the test time was 22 hours was recorded as a permanent compression 1 (abbreviated as deformation 1), and a permanent compression obtained when the test time was 30 hours was recorded as a permanent compression 2 (abbreviated as deformation 2). The larger the increase ratio of the deformation 2 relative to the deformation 1 is, the easier the deformation of the seal ring is, and the shorter the service life is.

Running time: the seal ring was installed in a reverse osmosis device and operated according to the actual operating conditions. The reverse osmosis pressure was 25 MPa, and the leakage time was observed. The longer the running time is, the longer the service life of the seal ring is.

The results of the above performance test are shown in Table 2 below.

TABLE 2

Performance test results of nitrile rubber composites and seal rings in Embodiments 1-8 and Comparative Examples 1 and 2

| Embodiments and comparative examples | ML/ dN·m | Tensile strength/ MPa | Hardness (Shore A)/ degrees | Deformation 1/% | Deformation 2/% | Increase proportion/ % | Running time/ month |
|---|---|---|---|---|---|---|---|
| Embodiment 1 | 1.35 | 27 | 63 | 18.3 | 23.5 | 28.4 | 7 |
| Embodiment 2 | 1.42 | 25 | 68 | 17.1 | 22.7 | 32.7 | 6.5 |
| Embodiment 3 | 1.48 | 22 | 72 | 17.3 | 23.1 | 33.5 | 6 |
| Embodiment 4 | 1.59 | 25 | 76 | 17.9 | 23.2 | 29.6 | 6.5 |
| Embodiment 5 | 1.75 | 23 | 88 | 19.2 | 24.7 | 28.6 | 7 |
| Embodiment 6 | 1.72 | 21 | 91 | 18.9 | 24.5 | 29.6 | 7 |
| Embodiment 7 | 1.64 | 26 | 81 | 18.3 | 24.1 | 31.7 | 6.5 |
| Embodiment 8 | 1.69 | 23 | 85 | 18.8 | 24.8 | 31.9 | 6.5 |
| Comparative Example 1 | 1.98 | 19 | 82 | 20.3 | 28.5 | 40.4 | 4 |
| Comparative Example 2 | 1.92 | 18 | 83 | 21.6 | 30.5 | 41.2 | 4 |

It can be seen from the results of Table 2 that the nitrile rubber composites provided by the present invention (Embodiments 1-8) have better processability even if more carbon black is added; the seal rings prepared by the present invention have better tensile resistance, and even if the Shore A hardness reaches 85 degrees or more, the tensile strength also reaches 20 MPa or more; and the seal rings prepared according to the present invention have a better permanent compression and longer service life in practical applications, and can be used as seal rings for reverse osmosis devices used in high reverse osmosis pressure applications.

The foregoing descriptions are intended merely as embodiments of the present invention, and it should be understood that those of general technical skill in the field may further make improvements and modifications without departing from the principles of the present disclosure, and all such improvements and modifications should be deemed to be within the protected scope of the present disclosure.

What is claimed is:

1. A nitrile rubber composite, containing the following preparation raw materials in parts by mass:
   100 parts of raw nitrile rubber,
   0.1-5 parts of liquid nitrile rubber modified graphene oxide;
   60-90 parts of liquid nitrile rubber modified carbon black;
   1-3 parts of anti-aging agent;
   2-6 parts of compound vulcanizing agent; and
   1-3 parts of accelerant,
   wherein the liquid nitrite rubber modified graphene oxide is obtained from a reaction of amino-terminated liquid nitrite rubber with graphene oxide.

2. The nitrite rubber composite according to claim 1, wherein the Mooney viscosity of raw nitrile rubber is 40-65 and the mass fraction of acrylonitrile in the raw nitrite rubber is 20-30%.

3. The nitrile rubber composite according to claim 1, wherein the liquid nitrile rubber modified carbon black is obtained from a reaction of amino-terminated liquid nitrile rubber with carbon black treated with an epoxy silane coupling agent.

4. The nitrite rubber composite according to claim 1, wherein the mass fraction of amino in the amino-terminated liquid nitrile rubber is ≥15%.

5. The nitrite rubber composite according to claim 3, wherein the relative molecular mass of the amino-terminated liquid nitrite rubber is 2000-4000; and mass fraction of amino in the amino-terminated liquid nitrile rubber is ≥15%.

6. The nitrile rubber composite according to claim 3, wherein the epoxy silane coupling agent comprises one or several out of 3-(glycidoxypropyl)triethoxysilane, 3-glycidoxypropyl trimethoxysilane, 3-glycidoxypropyl methyldiethoxysilane, 3-glycidoxypropyl methyldimethoxysilane, (3,4-cyclohexyl epoxide)ethyltriethoxysilane and 2-(3,4-cyclohexyl epoxide)ethyltrimethoxysilane.

7. The nitrite rubber composite according to claim 3, wherein the carbon black comprises semi-reinforcing carbon black and fine-particle thermal-cracking carbon black.

8. The nitrite rubber composite according to claim 1, wherein the anti-aging agent comprises one or several out of 2,2'-methylenebis(6-tert-butyl-4-methyl-phenol), poly(1,2-dihydro-2,2,4-trimethyl-quinoline) and N-1,3-dimethylbutyl-N'-phenyl-p-phenylenediamine;
   the compound vulcanizing agent comprises sulphur and a peroxide vulcanizing agent; and
   the accelerant comprises one or several out of triallyl cyanurate, triallyl isocyanurate and m-phenylene bismaleimide.

9. A preparation method for the nitrile rubber composite according to claim 1, comprising the following step:
   mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

10. A preparation method for the nitrile rubber composite according to claim 2, comprising the following step:

mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

11. A preparation method for the nitrile rubber composite according to claim 4, comprising the following step:

mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

12. A preparation method for the nitrile rubber composite according to claim 4, comprising the following step:

mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

13. A preparation method for the nitrile rubber composite according to claim 6, comprising the following step:

mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

14. A preparation method for the nitrile rubber composite according to claim 6, comprising the following step:

mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

15. A preparation method for the nitrile rubber composite according to claim 7, comprising the following step:

mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

16. A preparation method for the nitrile rubber composite according to claim 8, comprising the following step:

mixing the raw nitrile rubber, the liquid nitrile rubber modified graphene oxide, the liquid nitrile rubber modified carbon black, the anti-aging agent, the compound vulcanizing agent and the accelerant to obtain the nitrile rubber composite.

17. A sealing ring prepared using the nitrile rubber composite of claim 1.

18. A sealing ring prepared using the nitrile rubber composite prepared according to the preparation method of claim 9.

* * * * *